(12) United States Patent
Yu et al.

(10) Patent No.: US 9,097,860 B2
(45) Date of Patent: Aug. 4, 2015

(54) LENS ASSEMBLY

(71) Applicant: ABILITY OPTO-ELECTRONICS TECHNOLOGY CO., LTD., Taichung (TW)

(72) Inventors: Hung-Kuo Yu, Taichung (TW); Chao-Hsiang Yang, Taichung (TW)

(73) Assignee: Ability Opto-Electronics Technology Co., LTD., Taichung (TW)

( * ) Notice: Subject to any disclaimer, the term of this patent is extended or adjusted under 35 U.S.C. 154(b) by 0 days.

(21) Appl. No.: 14/141,665

(22) Filed: Dec. 27, 2013

(65) Prior Publication Data
US 2015/0062724 A1    Mar. 5, 2015

(30) Foreign Application Priority Data
Sep. 2, 2013   (TW) .................................. 102131525

(51) Int. Cl.
*G02B 3/02*    (2006.01)
*G02B 9/34*    (2006.01)
*G02B 13/00*   (2006.01)
*G02B 13/04*   (2006.01)

(52) U.S. Cl.
CPC ............... *G02B 9/34* (2013.01); *G02B 13/004* (2013.01); *G02B 13/04* (2013.01)

(58) Field of Classification Search
CPC .................................................. G02B 13/0045
USPC ......................................................... 359/715
See application file for complete search history.

(56) References Cited

U.S. PATENT DOCUMENTS

| 8,014,080 B1 | 9/2011 | Chen et al. |
| 8,189,272 B1 * | 5/2012 | Huang et al. ................... 359/715 |
| 2011/0128615 A1 | 6/2011 | Tsai |
| 2012/0044403 A1 | 2/2012 | Tang et al. |
| 2012/0099009 A1 | 4/2012 | Hsu et al. |
| 2012/0140339 A1 | 6/2012 | Huang et al. |
| 2012/0250164 A1 | 10/2012 | Tsai et al. |
| 2013/0070347 A1 | 3/2013 | Tang et al. |

FOREIGN PATENT DOCUMENTS

| JP | 2004102234 A | 4/2004 |
| JP | 2007178089 A | 7/2007 |
| JP | 2009192819 A | 8/2009 |
| TW | 201215941 A1 | 4/2012 |

* cited by examiner

*Primary Examiner* — James Jones
(74) *Attorney, Agent, or Firm* — LeClairRyan (57) ABSTRACT

A lens assembly includes a lens set which includes a first lens, a second lens, a third lens and a fourth lens arranged in sequence along an optical axis. The first lens has a positive optical power. The second lens has a positive optical power. The third lens has a negative optical power. The fourth lens has a positive optical power, and has an image-side surface, an object-side surface, and a peripheral surface interconnecting the two. At least one of the object-side and image-side surfaces has an inflection point located between the optical axis and the peripheral surface. The lens assembly satisfies 15<HFOV/f<50, in which, HFOV represents one half of a maximum angle of view of the lens assembly, and f represents a focal length thereof.

7 Claims, 9 Drawing Sheets

FIG.9

LENS ASSEMBLY

CROSS-REFERENCE TO RELATED APPLICATION

This application claims priority of Taiwanese Application No. 102131525, filed on Sep. 2, 2013.

BACKGROUND OF THE INVENTION

1. Field of the Invention

The present invention relates to a lens assembly, more particularly to a compact wide-angle four-piece imaging lens assembly.

2. Description of the Related Art

A conventional imaging lens assembly is frequently adopted in an electronic product, such as a mobile phone, a smart phone, a tablet computer, a notebook computer, a camera and so forth. With the continuous improvement of electronic products, a tendency toward compact design while maintaining high performance of the electronic products is desired. Accordingly, an imaging lens assembly is also developed toward a trend of being compact and having thin dimensions. Meanwhile, for the purpose of raising resolving power, an imaging lens assembly is required to progress to have a wider angle of view.

Even though conventional imaging lens assemblies, such as the optical lens assemblies disclosed in Taiwanese Patent Application Publication Numbers 201215941, 201224568 and 201239443, are provided with four-piece lens frameworks, these imaging lens assemblies may not further satisfy a desire for compact design and a wider angle of view.

Accordingly, in order to enable an electronic device to achieve effects of both compact design and high performance, a wide-angle imaging lens assembly capable of improving resolving power thereof and having miniature dimensions is desired on the market.

SUMMARY OF THE INVENTION

Therefore, an object of the present invention is to provide a four-piece imaging lens assembly which has compact and thin dimensions and which has a wider angle of view for improving resolving power thereof.

Accordingly, a lens assembly of the present invention comprises a lens set and a non-adjustable diaphragm. The lens set includes a first lens, a second lens, a third lens and a fourth lens arranged in sequence from an object side to an image side along an optical axis of the lens assembly. The first lens has a positive optical power adjacent to the optical axis, and has a convex object-side surface which faces the object side, and an image-side surface which faces the image side. At least one of the object-side surface and the image-side surface of the first lens is an aspherical surface. The second lens has a positive optical power adjacent to the optical axis, and has a convex image-side surface which faces the image side, and an object-side surface which faces the object side. At least one of the object-side surface and the image-side surface of the second lens is an aspherical surface. The third lens has a negative optical power adjacent to the optical axis, and has a concave object-side surface which faces the object side, and a convex image-side surface which faces the image side. At least one of the object-side surface and the image-side surface of the third lens is an aspherical surface. The fourth lens has a positive optical power adjacent to the optical axis, and has an image-side surface which faces the image side and which has a concave portion around the optical axis, an object-side surface which faces the object side, and a peripheral surface which interconnects the object-side surface and the image-side surface. Each of the object-side surface and the image-side surface of the fourth lens is an aspherical surface. At least one of the object-side surface and the image-side surface of the fourth lens has an inflection point located between the optical axis and the peripheral surface. The non-adjustable diaphragm is located between the object side and the second lens of the lens set. The lens assembly satisfies $15 < HFOV/f < 50$, in which, HFOV represents one half of a maximum angle of view of the lens assembly and has a unit of degree, and f represents a focal length of the lens assembly and has a unit of millimeter.

BRIEF DESCRIPTION OF THE DRAWINGS

Other features and advantages of the present invention will become apparent in the following detailed description of the three preferred embodiments with reference to the accompanying drawings, of which.

DETAILED DESCRIPTION OF THE PREFERRED EMBODIMENTS

Figure 1:
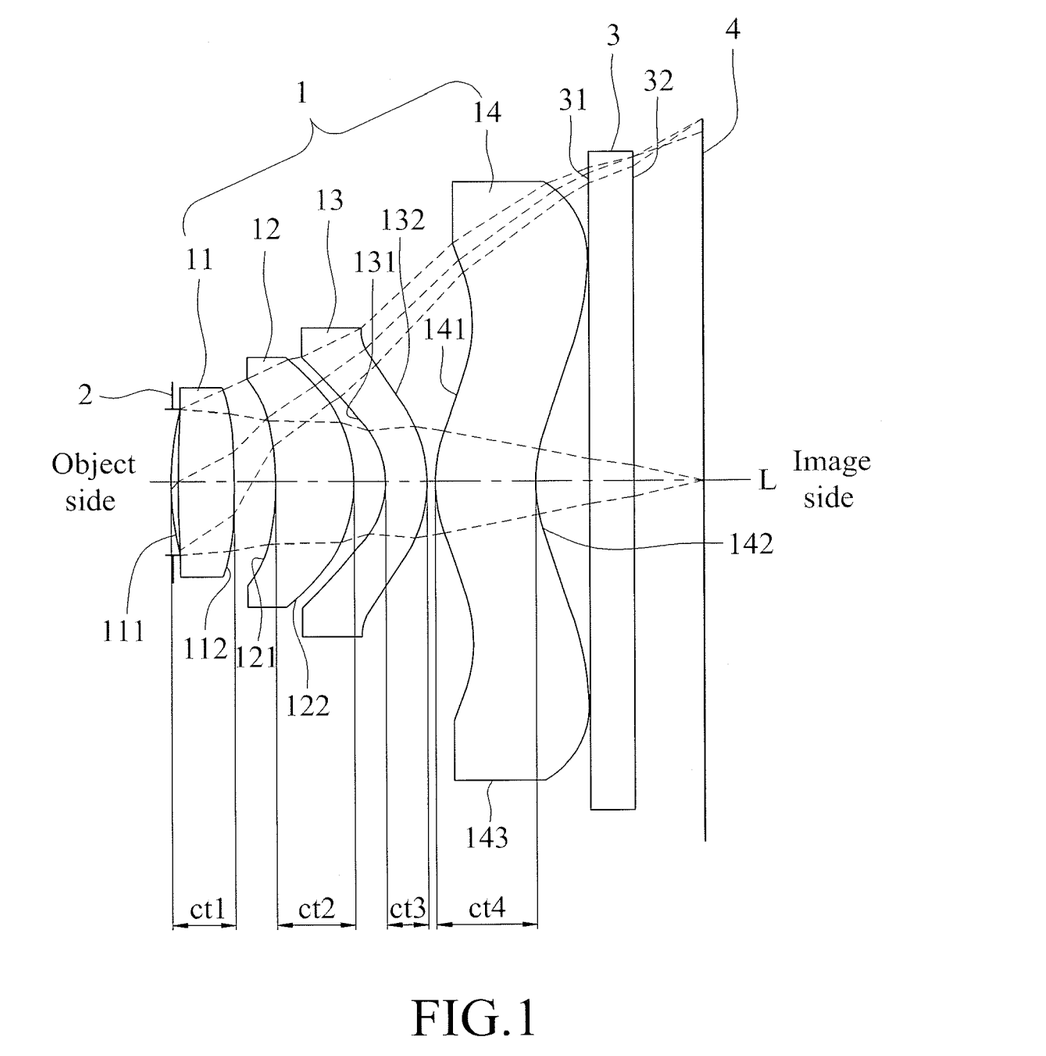
FIG. 1 is a schematic diagram illustrating a first preferred embodiment of a lens assembly according to the present invention.

Referring to FIG. 1, a first preferred embodiment of a lens assembly, according to the present invention, comprises a lens set 1, a non-adjustable diaphragm 2, and a filter lens 3.

The lens set 1 includes a first lens 11, a second lens 12, a third lens 13 and a fourth lens 14 arranged in sequence from an object side to an image side along an optical axis L of the lens assembly. The first lens 11 has a positive optical power adjacent to the optical axis L, and has a convex object-side surface 111 which faces the object side, and an image-side surface 112 which faces the image side. At least one of the object-side surface 111 and the image-side surface 112 of the first lens 11 is an aspherical surface. The second lens 12 has a positive optical power adjacent to the optical axis L, and has a convex image-side surface 121 which faces the image side, and an object-side surface 122 which faces the object side. At least one of the object-side surface 121 and the image-side surface 122 of the second lens 12 is an aspherical surface. The third lens 13 has a negative optical power adjacent to the optical axis L, and has a concave object-side surface 131 which faces the object side, and a convex image-side surface 132 which faces the image side. At least one of the object-side surface 131 and the image-side surface 132 of the third lens 13 is an aspherical surface. The fourth lens 14 has a positive optical power adjacent to the optical axis L, and has an image-side surface 141 which faces the image side and which has a concave portion around the optical axis L, an object-side surface 142 which faces the object side, and a peripheral surface 143 which interconnects the object-side surface 141 and the image-side surface 142. Each of the object-side surface 141 and the image-side surface 142 of the fourth lens 14 is an aspherical surface. At least one of the object-side surface 141 and the image-side surface 142 of the fourth lens 14 has an inflection point located between the optical axis L and the peripheral surface 143.

The non-adjustable diaphragm 2 is located between the object side and the second lens 12 of the lens set 1.

The lens assembly satisfies the following conditions:

$$15 < HFOV/f < 50, \quad (1)$$

$$0.8 < |f/f3| < 2.5, \quad (2)$$

$$0.3 < ct1/ct2 < 2.0, \text{ and} \quad (3)$$

$$0 < ct3/ct4 < 1.0, \quad (4)$$

in which, HFOV represents one half of a maximum angle of view of the lens assembly and has a unit of degree, f represents a focal length of the lens assembly and has a unit of millimeter, f3 is a focal length of the third lens 13 and has a unit of millimeter, ct1 represents a center thickness of the first lens 11, ct2 represents a center thickness of the second lens 12, ct3 represents a center thickness of the third lens 13, ct4 represents a center thickness of the forth lens 14, and each of ct1, ct2, ct3 and ct4 has a unit of millimeter.

Preferably, the lens assembly of the present invention further satisfies the following conditions:

$$HFOV > 35°, \text{ and} \quad (5)$$

$$f < 2.7 \text{ mm}. \quad (6)$$

The condition (1) explicates that a higher value of HFOV represents a wider angle of view of the lens assembly of the present invention so as to increase the resolving power thereof, while a lower value of the focal length f enables a more compact lens assembly. Conditions (5) and (6) further explicate advantages of the wider angle of view and the compact and thin dimensions of the lens assembly of the present invention.

It is noted that the lens assembly of the present invention further satisfies the following conditions:

$$Nd3 > 1.56, \quad (7)$$

$$V3 < 29, \quad (8)$$

$$Nd2 < 1.56, \quad (9)$$

$$V2 > 29, \quad (10)$$

in which, Nd3 is a refractive index of the third lens 13 for light with a wavelength equal to 587 nanometers, V3 is a coefficient of dispersion of the third lens 13 for light with a wavelength equal to 587 nanometers, Nd2 is a refractive index of the second lens 12 for light with a wavelength equal to 587 nanometers, and V2 is a coefficient of dispersion of the second lens 12 for light with a wavelength equal to 587 nanometers. Conditions (7) to (10) explicate that an absolute value of the optical power of the third lens 13 is greater than an absolute value of the optical power of the second lens 12 of the present invention.

Moreover, the aspherical surfaces of the lens assembly of the present invention satisfy:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots$$

in which, z is a displacement, along the optical axis L, of the aspherical surface from a vertex of the aspherical surface at a distance h from the optical axis L, c is a reciprocal of the radius of curvature, k is the conic constant, and A, B, C, D, E, F, G, H, J and so forth are aspheric coefficients. Surface profiles of the aspherical surfaces are able to correct aberrations, reduce tolerance sensitivity and provide a wide-angle capability.

First Preferred Embodiment

Figure 2:
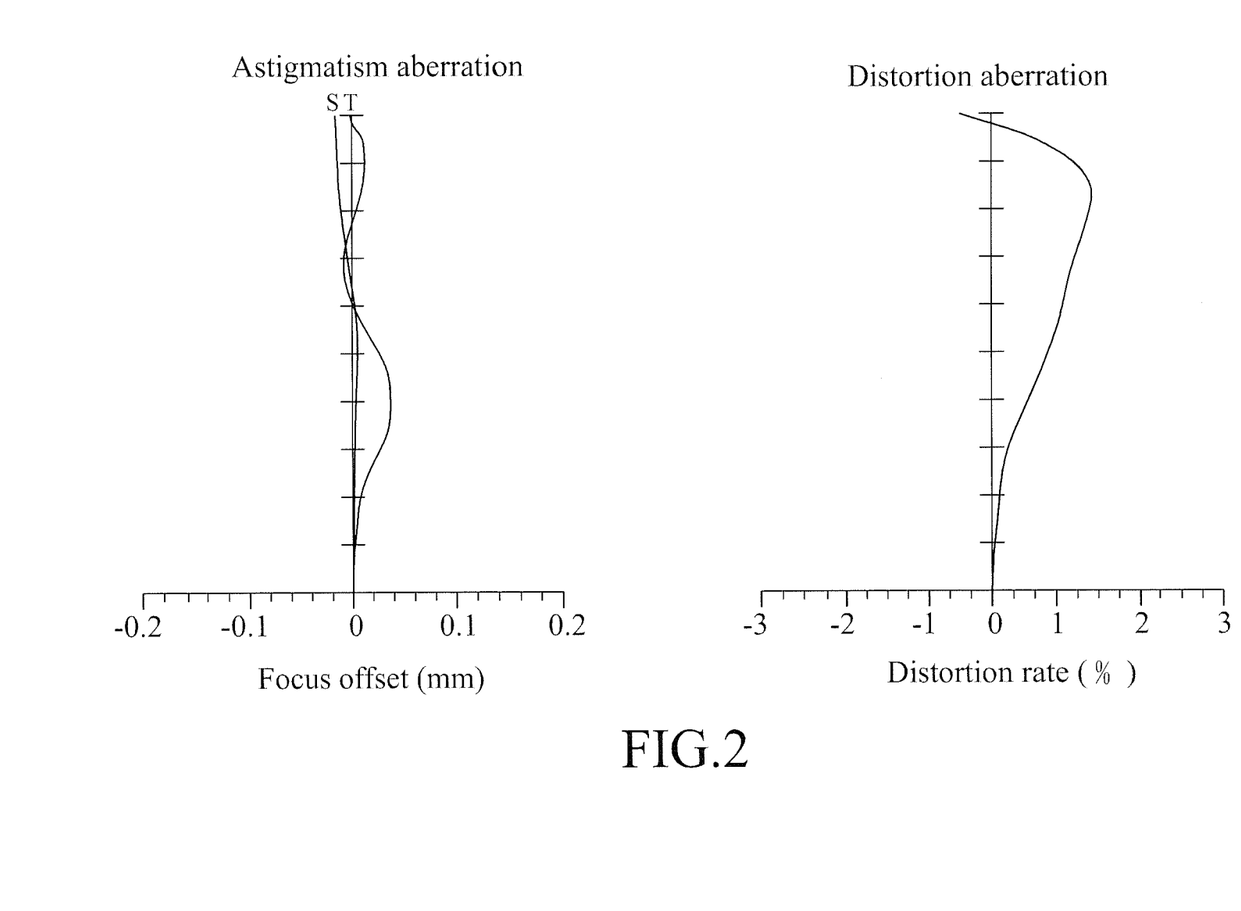
FIG. 2 illustrates simulation results of astigmatism aberration and distortion aberration of the first preferred embodiment.
Figure 3:
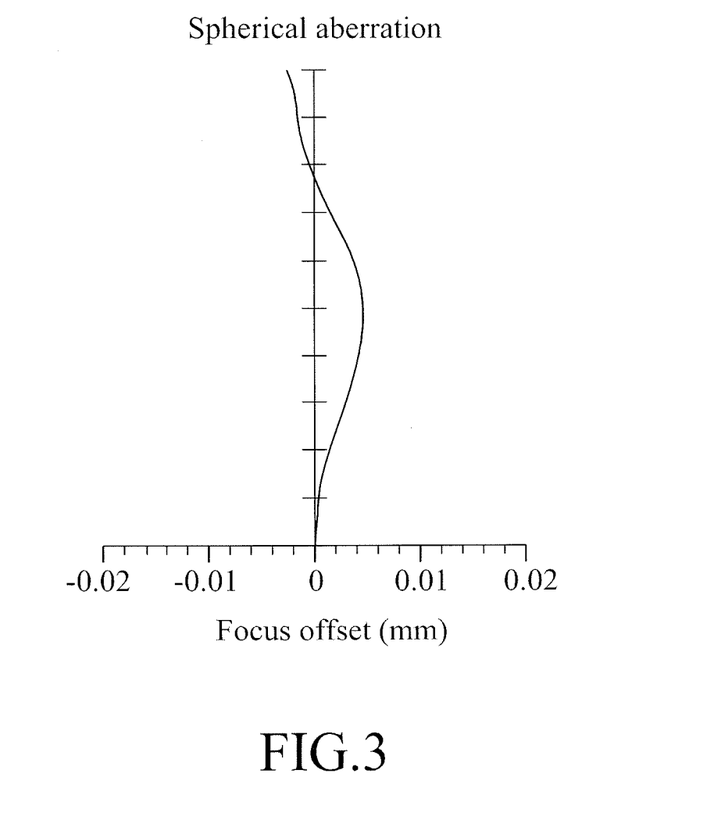
FIG. 3 illustrates simulation result of spherical aberration of the first preferred embodiment.

Referring to FIG. 1 to FIG. 3, parameters of the first preferred embodiment of the lens assembly are summarized as follows: f1=2.19 mm f2=2.05 mm, f3=−1.16 mm, f4=1.52 mm, f=1.60 mm, ct1=0.284 mm, ct2=0.368 mm, ct3=0.190 mm, ct4=0.472 mm, HFOV=44°.

The first preferred embodiment of the lens assembly satisfies condition (1) to condition (11), where: HFOV/f=27.5, |f/f3|=1.38, ct1/ct2=0.77, ct3/ct4=0.40, Nd2=1.535, Nd3=1.636, V2=56.07, V3=23.89.

FIG. 2 illustrates astigmatism aberration and distortion aberration of the first preferred embodiment. FIG. 3 illustrates spherical aberration of the first preferred embodiment. Table 1 below shows the parameters of components of the first preferred embodiment, in which the filter lens 3 has an object-side surface 31 and an image-side surface 32.

TABLE I

| | | First preferred embodiment | | | | |
|---|---|---|---|---|---|---|
| Component/ Surface | | Radius of curvature | Thickness/ Interspace | Refractive index | Abbe number | Focal length (mm) |
| Non-adjustable diaphragm 2 | | ∞ | −0.03 | | | |
| First lens 11 | Object-side surface 111 | 1.361 | 0.284 | 1.535 | 56.07 | 2.19 |
| | Image-side surface 112 | −8.119 | 0.194 | | | |

TABLE I-continued

First preferred embodiment

| Component/ Surface | | Radius of curvature | Thickness/ Interspace | Refractive index | Abbe number | Focal length (mm) |
|---|---|---|---|---|---|---|
| Second lens 12 | Object-side surface 121 | −2.042 | 0.368 | 1.535 | 56.07 | 2.05 |
| | Image-side surface 122 | −0.760 | 0.159 | | | |
| Third lens 13 | Object-side surface 131 | −0.289 | 0.190 | 1.636 | 23.89 | −1.16 |
| | Image-side surface 132 | −0.596 | 0.038 | | | |
| Fourth lens 14 | Object-side surface 141 | 0.488 | 0.472 | 1.535 | 56.07 | 1.52 |
| | Image-side surface 142 | 0.805 | 0.25 | | | |
| Filter lens 3 | Object-side surface 31 | ∞ | 0.21 | 1.517 | 64.17 | |
| | Image-side surface 32 | ∞ | 0.332 | | | |

Coefficients for the aspherical surfaces of the first preferred embodiment are provided in Table 2 below.

TABLE 2

| | First lens 11 | | Second lens 12 | |
|---|---|---|---|---|
| | Object-side surface 111 | Image-side surface 112 | Object-side surface 121 | Image-side surface 122 |
| k | 0 | 0 | 6.191788 | −3.784132 |
| A | −0.2065838 | −0.7720604 | −1.4905075 | −1.1446487 |
| B | −3.3390093 | 1.4937038 | 13.548352 | −13.499105 |
| C | 45.617387 | −48.87327 | −222.85883 | 142.67618 |
| D | −568.5172 | 417.56966 | 1762.543 | −811.19607 |
| E | 3836.6411 | −1866.3668 | −7503.2608 | 2964.6502 |
| F | −14300.609 | 3693.0414 | 17228.893 | −6161.6996 |
| G | 22470.012 | −1072.5651 | −16174.808 | 5342.7346 |

| | Third lens 13 | | Fourth lens 14 | |
|---|---|---|---|---|
| | Object-side surface 131 | Image-side surface 132 | Object-side surface 141 | Image-side surface 142 |
| k | −3.838175 | −1.077898 | −7.06691 | −2.241616 |
| A | −4.9202522 | −0.5217609 | 0.10412867 | −0.3678477 |
| B | 18.914991 | 0.96784978 | −1.6835431 | 0.10715581 |
| C | −20.771041 | 12.065814 | 4.2811759 | 0.31062561 |
| D | 12.125511 | −36.497597 | −6.3438122 | −0.5323217 |
| E | −142.85927 | 22.957229 | 5.6351203 | 0.37789525 |
| F | 243.02698 | 33.940443 | −2.7711759 | −0.1331061 |
| G | 30.761799 | −33.635537 | 0.58039414 | 0.018683511 |

Second Preferred Embodiment

Figure 4:
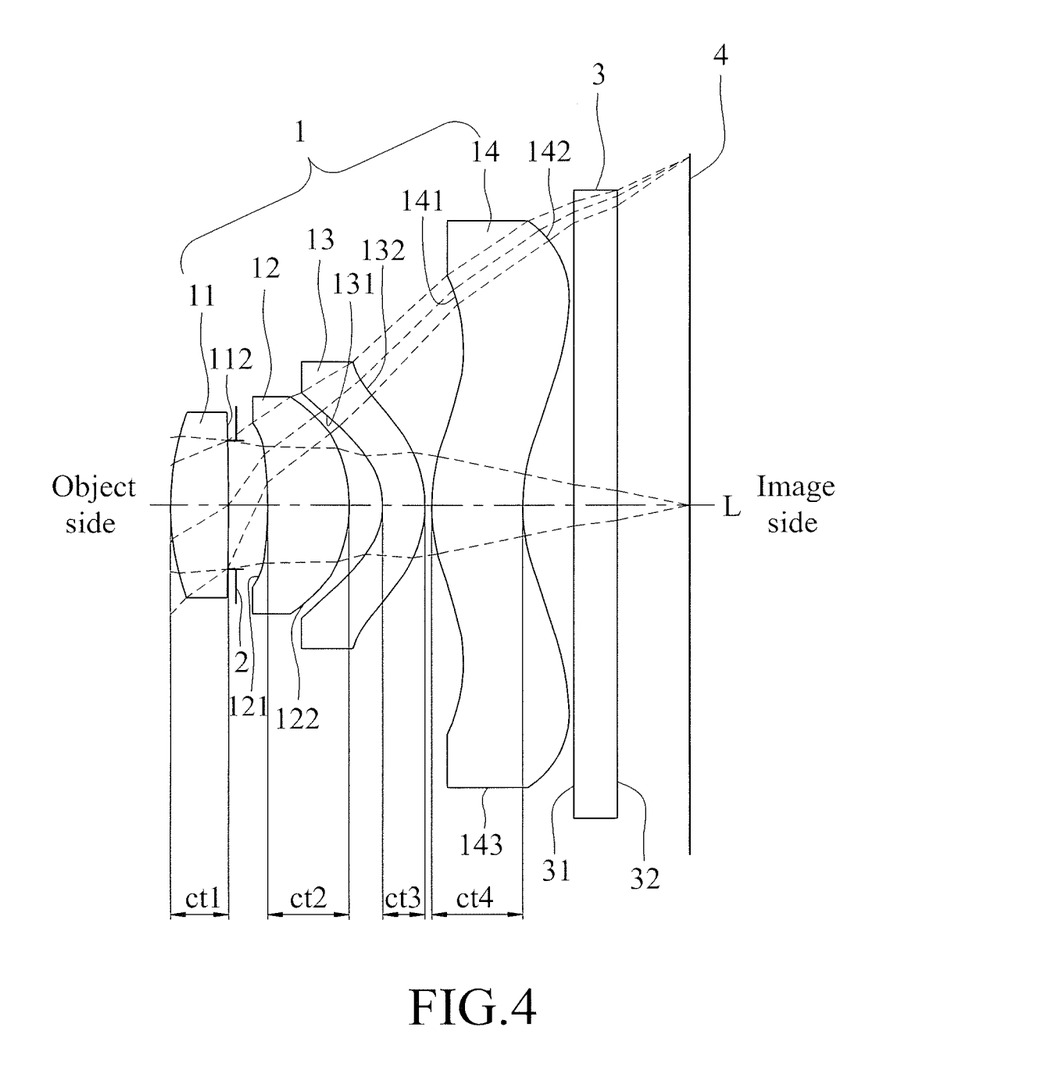
FIG. 4 is a schematic diagram illustrating a second preferred embodiment of a lens assembly according to the present invention.
Figure 5:
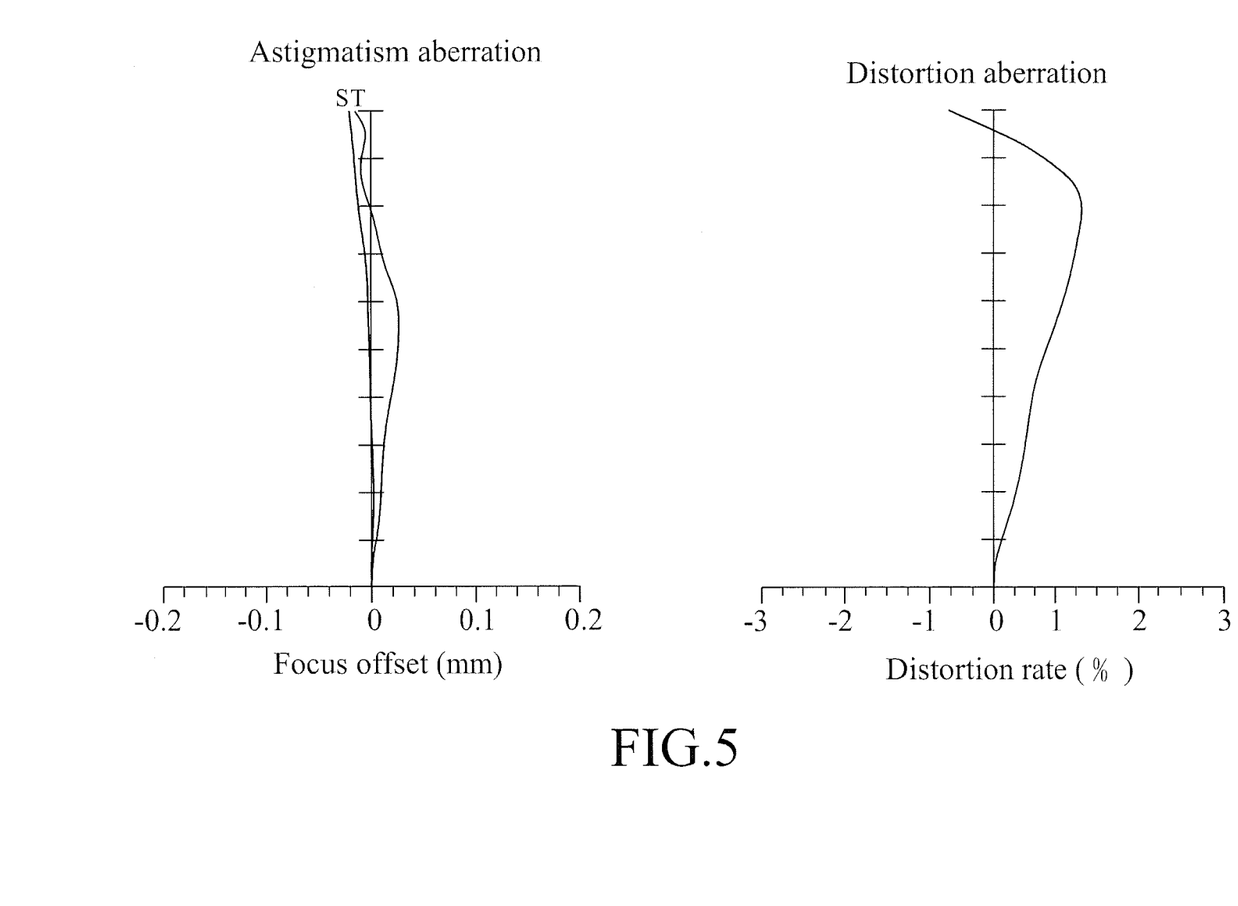
FIG. 5 illustrates simulation results of astigmatism aberration and distortion aberration of the second preferred embodiment.
Figure 6:
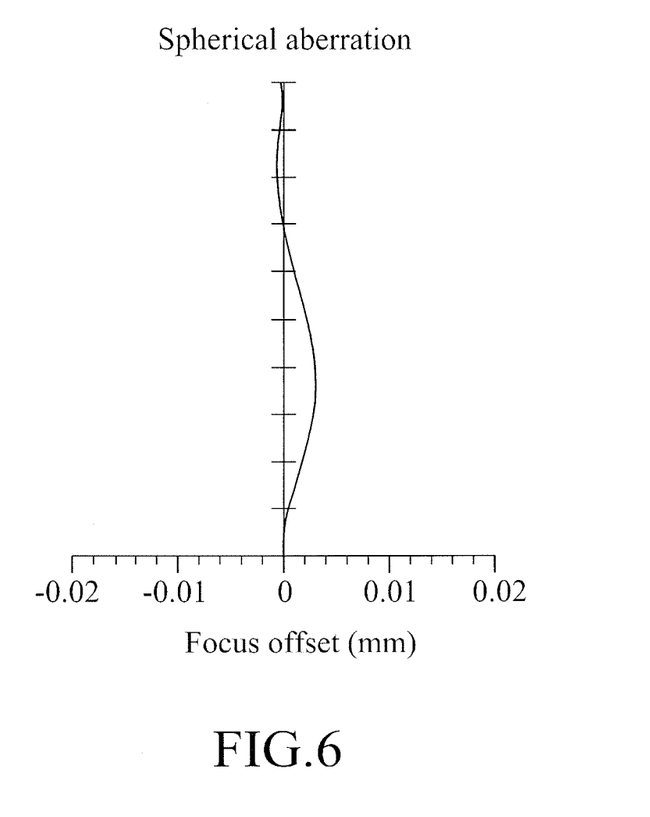
FIG. 6 illustrates simulation result of spherical aberration of the second preferred embodiment.

Referring to FIG. 4 to FIG. 6, parameters of a second preferred embodiment of the lens assembly, according to the present invention, are summarized as follows: f1=2.39 mm, f2=2.08 mm, f3=−1.45 mm, f4=1.85 mm, f=1.60 mm, ct1=0.276 mm, ct2=0.392 mm, ct3=0.204 mm, ct4=0.450 mm, HFOV=44°, and are further tabulated in Table 3.

The second preferred embodiment of the lens assembly satisfies condition (1) to condition (11), where: HFOV/f=27.5, |f/f3|=1.10, ct1/ct2=0.70, ct3/ct4=0.45, Nd2=1.535, Nd3=1.636, V2=56.07, V3=23.89.

FIG. 5 illustrates astigmatism aberration and distortion aberration of the second preferred embodiment. FIG. 6 illustrates spherical aberration of the second preferred embodiment.

TABLE 3

Second preferred embodiment

| Component/ Surface | | Radius of curvature | Thickness/ Interspace | Refractive index | Abbe number | Focal length (mm) |
|---|---|---|---|---|---|---|
| First lens 11 | Object-side surface 111 | 1.172 | 0.276 | 1.535 | 56.07 | 2.39 |

TABLE 3-continued

Second preferred embodiment

| Component/ Surface | | Radius of curvature | Thickness/ Interspace | Refractive index | Abbe number | Focal length (mm) |
|---|---|---|---|---|---|---|
| | Image-side surface 112 | 12.524 | 0.002 | | | |
| Non-adjustable diaphragm 2 | | ∞ | 0.193 | | | |
| Second lens 12 | Object-side surface 121 | −2.352 | 0.392 | 1.535 | 56.07 | 2.08 |
| | Image-side surface 122 | −0.800 | 0.165 | | | |
| Third lens 13 | Object-side surface 131 | −0.295 | 0.204 | 1.636 | 23.89 | −1.45 |
| | Image-side surface 132 | −0.550 | 0.022 | | | |
| Fourth lens 14 | Object-side surface 141 | 0.526 | 0.450 | 1.535 | 56.07 | 1.85 |
| | Image-side surface 142 | 0.786 | 0.25 | | | |
| Filter lens 3 | Object-side surface 31 | ∞ | 0.21 | 1.517 | 64.17 | |
| | Image-side surface 32 | ∞ | 0.352 | | | |

Coefficients for the aspherical surfaces of the second preferred embodiment are provided in the following Table 4.

TABLE 4

| | First lens 11 | | Second lens 12 | |
|---|---|---|---|---|
| | Object-side surface 111 | Image-side surface 112 | Object-side surface 121 | Image-side surface 122 |
| k | −27.67006 | 0 | 0 | −0.1133277 |
| A | 1.9885098 | −0.37701082 | −0.96274237 | −0.00025411 |
| B | −16.754161 | −0.49422655 | 2.5787486 | −13.638266 |
| C | 121.87784 | −25.697915 | −75.20593 | 119.14826 |
| D | −697.96568 | 372.82808 | 563.02784 | −775.83633 |
| E | 2523.3236 | −3090.4143 | −2537.022 | 3121.5568 |
| F | −5159.4588 | 12641.669 | 4107.643 | −6765.6192 |
| G | 4272.9124 | −20091.048 | 1821.596 | 6044.1686 |

| | Third lens 13 | | Fourth lens 14 | |
|---|---|---|---|---|
| | Object-side Surface 131 | Image-side surface 132 | Object-side Surface 141 | Image-side surface 142 |
| k | −3.670904 | −1.681659 | −7.045281 | −3.872049 |
| A | −3.9824733 | −0.37652375 | 0.000309204 | −0.15744128 |
| B | 9.3522783 | −3.5402459 | −1.3786241 | −0.21216838 |
| C | −14.277191 | 22.786238 | 3.9107049 | 0.6311134 |
| D | 58.628841 | −34.875393 | −6.1155891 | −0.74118053 |
| E | 13.198369 | −6.5038799 | 5.4923776 | 0.45196807 |
| F | −631.1631 | 60.790568 | −2.6266688 | −0.14266076 |
| G | 956.17439 | −37.919506 | 0.51902791 | 0.01825282 |

Third Preferred Embodiment

Figure 7:
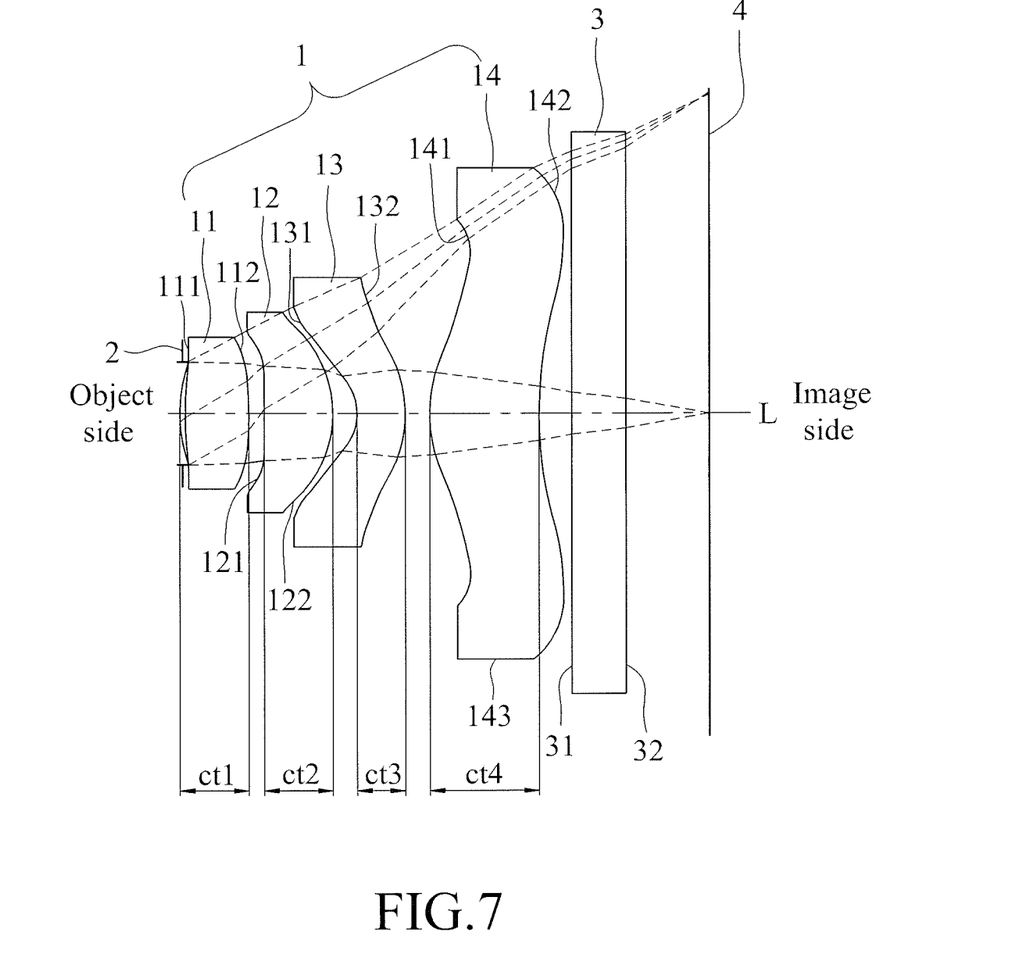
FIG. 7 is a schematic diagram illustrating a third preferred embodiment of a lens assembly according to the present invention.
Figure 8:
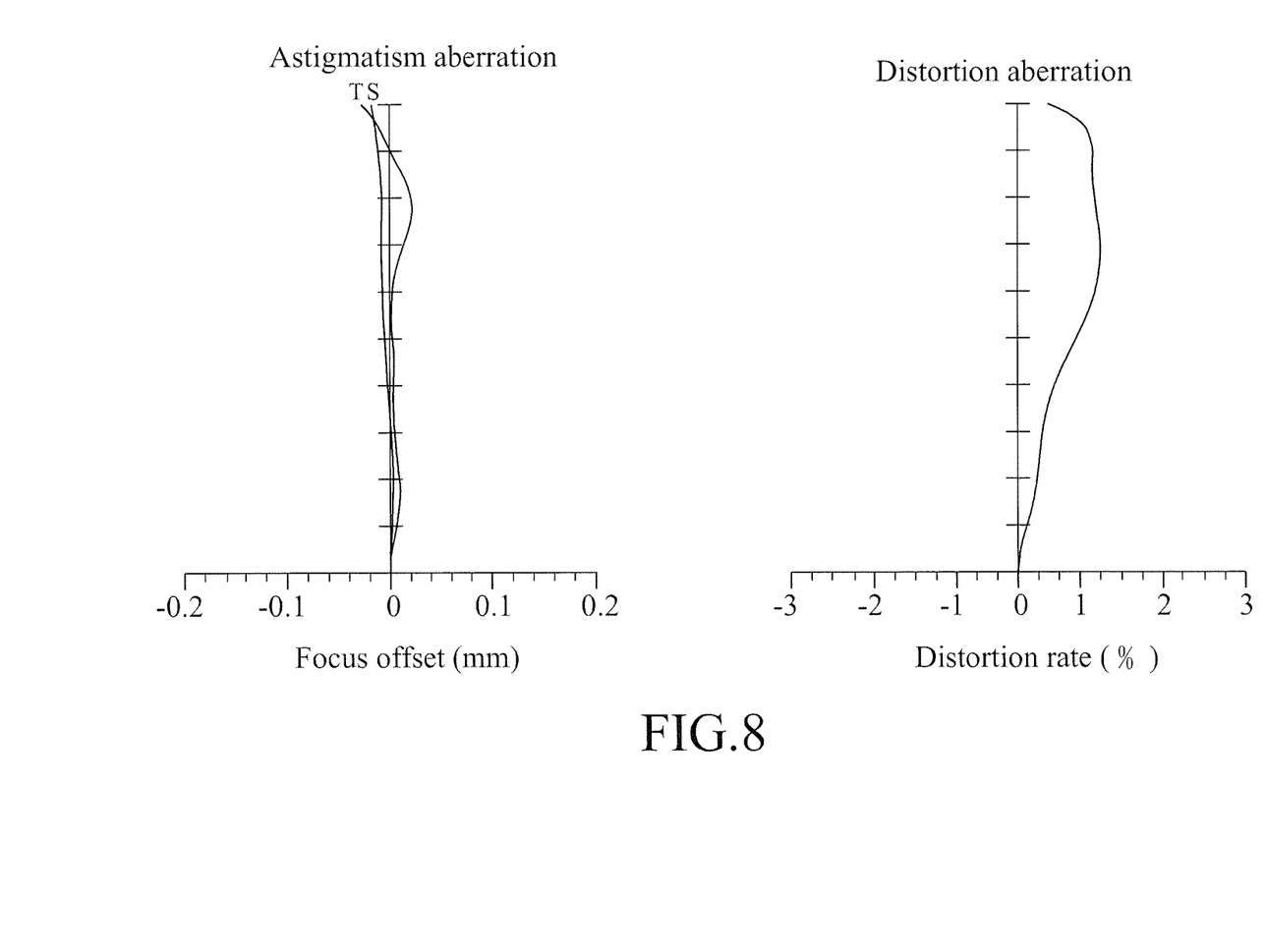
FIG. 8 illustrates simulation results of astigmatism aberration and distortion aberration of the third preferred embodiment.
Figure 9:
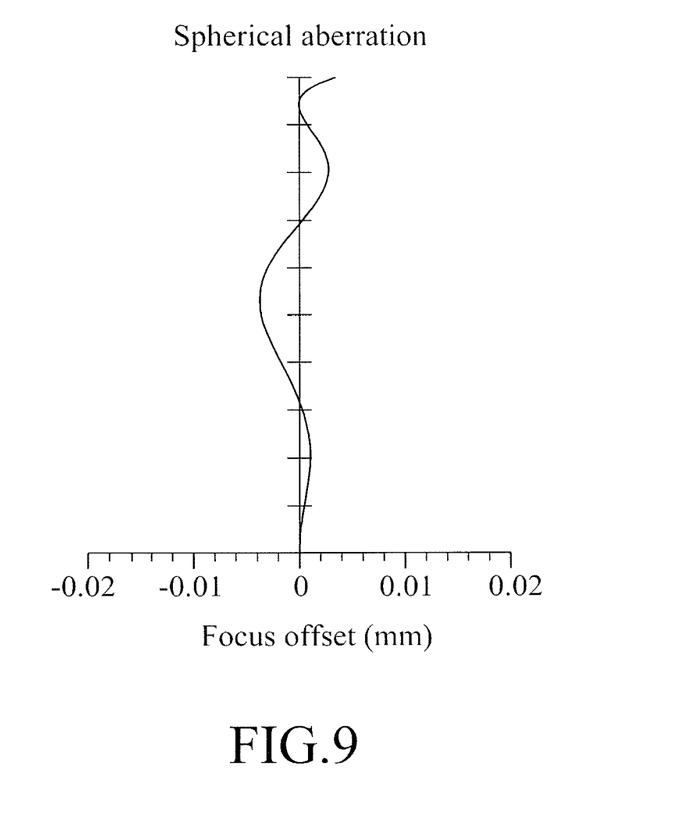
FIG. 9 illustrates simulation result of spherical aberration of the third preferred embodiment.

Referring to FIG. 7 to FIG. 9, parameters of a third preferred embodiment of the lens assembly, according to the present invention, are summarized as follows: f1=2.55 mm, f2=0.86 mm, f3=−0.61 mm, f4=0.98 mm, f=1.13 mm, ct1=0.239 mm, ct2=0.266 mm, ct3=0.187 mm, ct4=0.429 mm, HFOV=44°, and are further tabulated in Table 5.

The third preferred embodiment of the lens assembly satisfies condition (1) to condition (11), where: HFOV/f=39.0, |f/f3|=1.85, ct1/ct2=0.90, ct3/ct4=0.44, Nd2=1.535, Nd3=1.636, V2=56.07, V3=23.89.

FIG. 8 illustrates astigmatism aberration and distortion aberration of the third preferred embodiment. FIG. 9 illustrates spherical aberration of the third preferred embodiment.

TABLE 5

Third preferred embodiment

| Component/ Surface | | Radius of curvature | Thickness/ Interspace | Refractive index | Abbe number | Focal length (mm) |
|---|---|---|---|---|---|---|
| Non-adjustable diaphragm 2 | | ∞ | −0.001 | | | |
| First lens 11 | Object-side surface 111 | 1.903 | 0.239 | 1.535 | 56.07 | 2.55 |
| | Image-side surface 112 | −4.616 | 0.062 | | | |
| Second lens 12 | Object-side surface 121 | 3.029 | 0.266 | 1.535 | 56.07 | 0.86 |
| | Image-side surface 122 | −0.528 | 0.095 | | | |
| Third lens 13 | Object-side surface 131 | −0.184 | 0.187 | 1.636 | 23.89 | −0.61 |
| | Image-side surface 132 | −0.483 | 0.092 | | | |

TABLE 5-continued

Third preferred embodiment

| Component/ Surface | | Radius of curvature | Thickness/ Interspace | Refractive index | Abbe number | Focal length (mm) |
|---|---|---|---|---|---|---|
| Fourth lens 14 | Object-side surface 141 | 0.430 | 0.429 | 1.535 | 56.07 | 0.98 |
|  | Image-side surface 142 | 1.549 | 0.125 |  |  |  |
| Filter lens 3 | Object-side surface 31 | ∞ | 0.210 | 1.517 | 64.17 |  |
|  | Image-side surface 32 | ∞ | 0.325 |  |  |  |

Coefficients for the aspherical surfaces of the third preferred embodiment are provided in the following Table 6.

TABLE 6

| | First lens 11 | | Second lens 12 | |
|---|---|---|---|---|
| | Object-side surface 111 | Image-side surface 112 | Object-side Surface 121 | Image-side surface 122 |
| k | 8.58328 | −2824.922 | 42.97767 | 0.7395685 |
| A | −1.2031657 | −9.8439198 | −7.1130345 | 0.63242517 |
| B | 12.223278 | 116.10956 | 4.0234552 | −132.3459 |
| C | −1918.3111 | −1775.4567 | −507.43521 | 2590.488 |
| D | 6722.3948 | −15124.178 | −7707.7496 | −20847.637 |
| E | 2123163.2 | 652775.39 | 80989.53 | 138170.7 |
| F | −52922573 | −5158083.1 | 1130631.4 | −1000249.5 |
| G | 3.7786e+008 | 11596365 | −8089358.7 | 3411687.3 |

| | Third lens 13 | | Fourth lens 14 | |
|---|---|---|---|---|
| | Object-side Surface 131 | Image-side surface 132 | Object-side Surface 141 | Image-side surface 142 |
| k | −1.926854 | −0.3569793 | −5.810289 | 1.443596 |
| A | −4.0319876 | −0.15762397 | −0.05755995 | −0.20237191 |
| B | −130.00916 | 8.7724173 | −1.4813813 | 0.7721049 |
| C | 3983.5728 | 116.23539 | 9.9370396 | −8.9338663 |
| D | −22497.967 | −218.09901 | −60.63752 | 26.574088 |
| E | −103474.15 | −4855.6445 | 190.69088 | −38.350854 |
| F | 1277642.5 | 24221.919 | −287.85565 | 27.456949 |
| G | −3002346 | −32489.178 | 163.69987 | −8.006268 |

To sum up, the effects of the present invention may be summarized as follows:

1. A feature of the present invention resides in that the lens assembly satisfies 15<HFOV/f<50. Moreover, the lens assembly also satisfies condition (1) to condition (11) so as to increase the resolving power of the lens assembly, increase angle of view thereof, and reduce a thickness thereof to achieve a compact design.

2. A higher value of HFOV of the lens assembly represents a wider angle of view of the lens assembly so as to increase the resolving power thereof.

3. A lower value of the focal length f of the lens assembly enables smaller and thinner dimensions thereof.

Therefore, the lens assembly of the present invention may have compact and thin dimensions while exhibiting high performances.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lens assembly comprising:
   a lens set which includes a first lens, a second lens, a third lens and a fourth lens arranged in sequence from an object side to an image side along an optical axis of said lens assembly, wherein
   said first lens has a positive optical power adjacent to the optical axis, and has a convex object-side surface which faces the object side, and an image-side surface which faces the image side, at least one of said object-side surface and said image-side surface of said first lens being an aspherical surface,
   said second lens has a positive optical power adjacent to the optical axis, and has a convex image-side surface which faces the image side, and a concave object-side surface which faces the object side, at least one of said object-side surface and said image-side surface of said second lens being an aspherical surface,
   said third lens has a negative optical power adjacent to the optical axis, and has a concave object-side surface which faces the object side, and a convex image-side surface which faces the image side, at least one of said object-side surface and said image-side surface of said third lens being an aspherical surface, said fourth lens has a positive optical power adjacent to the optical axis, and has an image-side surface which faces the image side and which has a concave portion around the optical axis, an object-side surface which faces the object side, and a peripheral surface which interconnects said object-side surface and said image-side surface, each of said object-side surface and said image-side surface of said fourth lens being an aspherical surface, at least one of said object-side surface and said image-side surface of said fourth lens having an inflection point located between the optical axis and said peripheral surface; and a non-adjustable diaphragm located between the object side and said second lens of said lens set;

wherein said lens assembly satisfies $15 < HFOV/f < 50$, in which, HFOV represents one half of a maximum angle of view of said lens assembly and has a unit of degree, and f represents a focal length of said lens assembly and has a unit of millimeter.

2. The lens assembly as claimed in claim 1, further satisfying:

$HFOV > 41°$.

3. The lens assembly as claimed in claim 1, further satisfying:

$f < 2.7$ mm, $f/f4 > 0.54$ in which, f4 is a focal length of said fourth lens and has a unit of millimeter.

4. The lens assembly as claimed in claim 1, further satisfying:

$Nd3 > 1.56$, and $V3 < 29$, in which, Nd3 is a refractive index of said third lens for light with a wavelength equal to 587 nanometers, and V3 is a coefficient of dispersion of said third lens for light with a wavelength equal to 587 nanometers.

5. The lens assembly as claimed in claim 4, further satisfying:

$Nd2 < 1.56$, and $V2 > 29$, in which, Nd2 is a refractive index of said second lens for light with a wavelength equal to 587 nanometers, and V2 is a coefficient of dispersion of said second lens for light with a wavelength equal to 587 nanometers.

6. The lens assembly as claimed in claim 1, further satisfying:

$0.8 < |f/f3| < 2.5$, in which, f3 is a focal length of said third lens and has a unit of millimeter.

7. The lens assembly as claimed in claim 1, further satisfying:

$0.67 < ct1/ct2 < 2.0$, and $0 < ct3/ct4 < 1.0$, in which, ct1 represents a center thickness of said first lens, ct2 represents a center thickness of said second lens, ct3 represents a center thickness of said third lens, ct4 represents a center thickness of said forth lens, and each of ct1, ct2, ct3 and ct4 has a unit of millimeter.

* * * * *